(No Model.)
H. W. JOHNS.
NON CONDUCTING COVERING.
No. 510,026.  Patented Dec. 5, 1893.
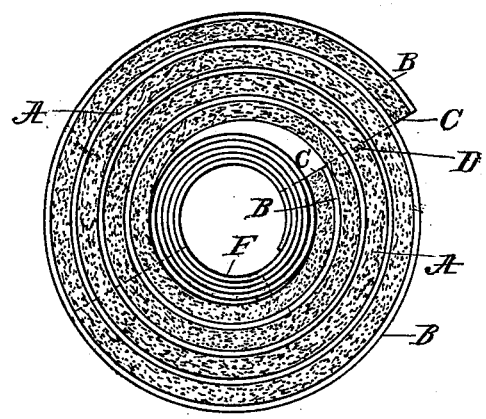
WITNESSES:
Edward C. Rowland.
D. Johs Ritterband
INVENTOR
Henry W. Johns.
By Phillips Abbott
ATTORNEY

UNITED STATES PATENT OFFICE.

HENRY W. JOHNS, OF NEW YORK, N. Y.

NON-CONDUCTING COVERING.

SPECIFICATION forming part of Letters Patent No. 510,026, dated December 5, 1893.

Application filed February 15, 1893. Serial No. 462,519. (No model.)

*To all whom it may concern:*

Be it known that I, HENRY W. JOHNS, a citizen of the United States, and a resident of New York city, in the county of New York and State of New York, have invented certain new and useful Non-Conducting Coverings, of which the following is a specification.

My invention relates to an improvement in non-conducting coverings, fire-proof linings and the like manufactures, of the class in which a sheet or layer of fibrous material is used in conjunction with interposed layers of plastic or plaster-like material. As these manufactures have heretofore been made, a difficulty has been experienced; that the heat of the hot surfaces acts injuriously upon the fibrous sheet, gradually reducing its strength, so that after a time, the plastic material or layer, having nothing sufficiently strong to support it, crumbles and falls away, especially when arranged on vertical pipes, and this has necessitated the previous coating or covering of the hot surfaces, with a layer, usually of asbestus cement, which has been applied by hand and is a laborious process, takes a long time and also is very dirty, almost invariably soiling the floors and walls adjacent to which the surfaces to be protected are or may be located.

By my invention, I overcome these difficulties and I make the covering in such manner that there is formed integrally with it, an interior lining of asbestus or other fire-proof material, which comes immediately in contact with the hot surface and outside of it, I arrange the alternating layers of fibrous material and plastic material, and the plastic material is so combined, that it will adhere to the sheet of fabric, during the rolling up process, and will alternate with it in the completed covering.

The process of manufacture is as follows: A suitable mandrel is arranged in a machine, so that it may be rotated. I then, first wind upon the mandrel one or more layers, preferably a number of them, of asbestus paper or fire-felt, so-called, preferably using that which has considerable thickness. The surface of this asbestus material or fire-proof material, it not being essential to use asbestus, is sufficiently coated with adhesive material to cause the several layers of it, if more than one layer be wrapped about the mandrel, to adhere together, so that, when the completed covering is cut across, the sections of this fire-proof interlining will not be separated from the rest of the covering. Then, after a sufficient quantity of the asbestus material has been wound upon the mandrel, I wind outside of it, a sheet of fibrous material, which, for very hot surfaces, should preferably be asbestus, but for certain uses, where the heat is not so great, a paper or cloth, not of asbestus may be employed. This sheet of material, whatever its character may be is coated with a layer from one-sixteenth to a quarter of an inch thick more or less, as desired, of plastic material, such as asbestus cement or any compound of clay, lime or other like incombustible substance, mixed to the proper consistency, so that the layer of plastic material will wind up upon the mandrel, together with the layer of fibrous material. These alternating layers are wound upon the mandrel until the desired thickness is attained. Thereupon the fabric and plastic material will be cut across, and then the tubular covering will be stripped off from the mandrel in a manner now well-understood. After the material has become sufficiently hard, the tubular covering is sawed in half longitudinally, so that the two sections may be readily applied to the pipe, and they may be held in place upon the pipe by suitable bands or other appliances, or a canvas or other covering may be employed, which will form a hinge, connecting the two halves of the covering. If preferred, the longitudinal sawing of the tube may be done so as not to cut the last or outside layer of the fabric sheet, which will then act as a hinge. I prefer to cut or saw the covering, so that the edges may be matched together or made to coincide, when put upon the pipe, and consequently, the cutting or sawing should preferably be done before the plastic material has so far set as to interfere with the bending or springing of the tubes necessary to bring the edges evenly together. In some forms of plastic material, however, which I use, there will always be sufficient strength to permit of this operation, without cracking the plastic material.

In the drawing hereof, I show a transverse sectional view of a piece of pipe covering made on my plan.

A is the plastic material.

B is the fabric.

C, C illustrate the edges of the material and D, the line on which it may be sawed or cut. The line of cut, as shown, does not extend quite through the covering, but only to the outer layer of the fabric B, so that it may act as a hinge, when applying the covering to the pipes, or it may be cut entirely through as stated.

F shows the interior layers of asbestus paper or other incombustible material. The meeting edges of this covering, after being put upon the pipe may be covered with paper, canvas, or other suitable material, cemented or otherwise held in place, and the entire exterior surface of the covering may be coated or ornamented with paint or in any other desired manner. As before stated, any suitable material may be used as a fabric upon which the plastic material is spread, preferably an asbestus fabric, because of its incombustibility, but for many uses, felt, paper, burlaps, canvas and the like materials may be employed, and in addition to the cement-like or plaster-like material mentioned by me, a compound embodying asbestus and sponge, which has been heretofore patented to me, may be used and to increase the porosity, strength and non-conductivity of the plaster-like layer, it may have any fibrous or porous material mixed with it, such as fibrous asbestus, hemp, wool, hair, ground sponge, saw-dust, chopped hay or straw, and any suitable adhesive material may be used to additionally bind or cement the layers of fabric and plastic material together, preferably, but not necessarily a fire-proof substance, such as silicate of soda.

When the non-conductor is to be used on surfaces other than tubular ones, I make the covering in flat or other suitable form to be properly applied to the surface to be protected.

It will be seen that by my invention, I make in a single structure, a covering adapted to withstand great heat, and that it is clean in application, and that it may be applied quickly and inexpensively. The asbestus paper on the interior of the covering prevents injurious action of the heat upon the fibrous material and upon the plastic material outside of the fire-proof lining.

I claim—

As a new article of manufacture, a non-conducting covering, comprising alternating layers of fabric and plastic material, and an inner lining of incombustible fibrous material, said lining and the fabric and the plastic material all being permanently attached together, forming an integral structure.

Signed at New York, in the county of New York and State of New York, this 8th day of February, A. D. 1893.

HENRY W. JOHNS.

Witnesses:
PHILLIPS ABBOTT,
JOHN C. LACEY.